(12) United States Patent
Yamamoto et al.

(10) Patent No.: US 6,739,211 B2
(45) Date of Patent: May 25, 2004

(54) SHIFT ACTUATOR FOR A TRANSMISSION

(75) Inventors: Yasushi Yamamoto, Kanagawa (JP);
Nobuyuki Iwao, Kanagawa (JP)

(73) Assignee: Isuzu Motors Limited, Tokyo (JP)

( * ) Notice: Subject to any disclaimer, the term of this patent is extended or adjusted under 35 U.S.C. 154(b) by 0 days.

(21) Appl. No.: 10/218,415

(22) Filed: Aug. 15, 2002

(65) Prior Publication Data

US 2003/0061891 A1 Apr. 3, 2003

(30) Foreign Application Priority Data

Sep. 28, 2001 (JP) ........................................ 2001-300832

(51) Int. Cl.[7] .......................... F16H 59/00; B60K 17/04
(52) U.S. Cl. ...................................... 74/335; 74/473.12
(58) Field of Search ............................... 74/335, 336 R, 74/337, 473.12, 473.21

(56) References Cited

U.S. PATENT DOCUMENTS

| 5,460,060 | A | * | 10/1995 | Nellums | 74/473 R |
| 6,559,746 | B2 | * | 5/2003 | Takanashi et al. | 335/256 |
| 2002/0096008 | A1 | * | 7/2002 | Yamamoto | 74/473.12 |
| 2002/0189388 | A1 | * | 12/2002 | Suzuki | 74/473.12 |

FOREIGN PATENT DOCUMENTS

| GB | 1480802 | * | 7/1977 |
| SU | 4612182 | * | 5/1993 |

* cited by examiner

*Primary Examiner*—Roger Pang

(57) ABSTRACT

A shift actuator for a transmission, comprising an operation rod that engages with an operation member coupled to the shift lever of the transmission, a magnetic moving means arranged on the outer peripheral surface of said operation rod, a cylindrical fixed yoke surrounding said magnetic moving means, and a pair of coils arranged side by side in the axial direction inside said fixed yoke, wherein magnetic members are arranged on both sides of said pair of coils.

3 Claims, 6 Drawing Sheets

(a)

(b)

(c)

(d)

(a)

(b)

SHIFT ACTUATOR FOR A TRANSMISSION

FIELD OF THE INVENTION

The present invention relates to a shift actuator for a transmission for operating, in the direction of shift, a shift lever of a transmission mounted on a vehicle.

DESCRIPTION OF THE RELATED ART

As the shift actuator for a transmission for operating a shift lever of the transmission in the direction of shift, there is generally used a fluid pressure cylinder by using a fluid pressure such as air pressure or hydraulic pressure as a source of operation. The shift actuator employing the fluid cylinder requires piping for connection to the source of fluid pressure, requires an electromagnetic change-over valve for changing over the flow passage of the operation fluid, and requires space for arranging the above components, resulting in an increase in weight of the device as a whole.

In recent years, there has been proposed an actuator of the type of an electric motor as a shift actuator for a transmission mounted on a vehicle which is provided with neither a source of compressed air nor a source of hydraulic pressure. The shift actuator constituted by the electric motor can be constituted in a compact size as a whole and in a reduced weight since it needs neither the piping for connection to the source of hydraulic pressure nor the electromagnetic change-over valve, unlike the actuators that use fluid pressure cylinders. The actuators using electric motors, however, require a speed reduction mechanism for obtaining a predetermined operation force. As the speed reduction mechanisms, there have been proposed the one using a ball-screw mechanism and the one using a gear mechanism. However, the actuators using the ball-screw mechanism and the gear mechanism are not necessarily satisfactory in regard to durability of the ball screw mechanism and of the gear mechanism and in regard to durability and the operation speed of the electric motors.

As a shift actuator for a transmission that has excellent durability and a high operation speed, therefore, the present applicant has proposed, in Japanese Patent Application No. 2001-013163, a shift actuator for a transmission, comprising an operation rod that engages with an operation member coupled to a shift lever of the transmission, a magnetic moving means arranged on the outer peripheral surface of the operation rod, a cylindrical fixed yoke surrounding the magnetic moving means, and a pair of coils arranged side by side in the axial direction inside the fixed yoke.

The shift actuator produces no driving force when the shifting mechanism is shifted to a shift stroke end, i.e., to a gear-engaging position. On the other hand, the shifting mechanism operated by the shift actuator receives a force in a direction in which the gear disengages, at the time when the transmission transmits the power. In order to prevent the gear from undesirably disengaging, therefore, the shifting mechanism must be limited from moving toward the neutral position side in a state where the shifting mechanism has been shifted to the shift stroke end, i.e., to the gear-engaging position and hence, produces no driving force. Therefore, the shifting mechanism in the transmission is provided with a detent mechanism for holding a state in which it has been shifted to the shift stroke end, i.e., to the gear-engaging position.

The detent mechanism usually has a constitution in which a detent ball pushed by a detent spring is brought into engagement with a dent formed in the shift rod that constitutes the shifting mechanism. To operate the shift rod shifted to the shift stroke end, i.e., to the gear-engaging position toward the neutral position side, the detent ball which has engaged with the dent formed in the shift rod must be caused to move along the tilted surface of the dent against the resilient force of the detent spring. Therefore, the shift actuator requires a large driving force.

If the shift actuator has a self-holding function for holding a state where it has been shifted to the shift stroke end, i.e., to the gear-engaging position, the shift rod needs no detent mechanism or the detent force can be made to small, making it possible to use a shift actuator having a small driving ability.

SUMMARY OF THE INVENTION

It is therefore an object of the present invention to provide a shift actuator having a self-holding function for holding a state in which the shifting mechanism has been shifted to the shift stroke end, i.e., to the gear-engaging position.

According to the present invention, to accomplish the above-mentioned object, there is provided a shift actuator for a transmission, comprising an operation rod that engages with an operation member coupled to the shift lever of the transmission, a magnetic moving means arranged on the outer peripheral surface of said operation rod, a cylindrical fixed yoke surrounding said magnetic moving means, and a pair of coils arranged side by side in the axial direction inside said fixed yoke, wherein magnetic members are arranged on both sides of said pair of coils.

The magnetic members are arranged in a bobbin on which the pair of coils are wound.

DETAILED DESCRIPTION OF THE PREFERRED EMBODIMENTS

The shift actuator for a transmission constituted according to the present invention will now be described in further detail with reference to the accompanying drawings illustrating preferred embodiments of the invention.

Figure 1:
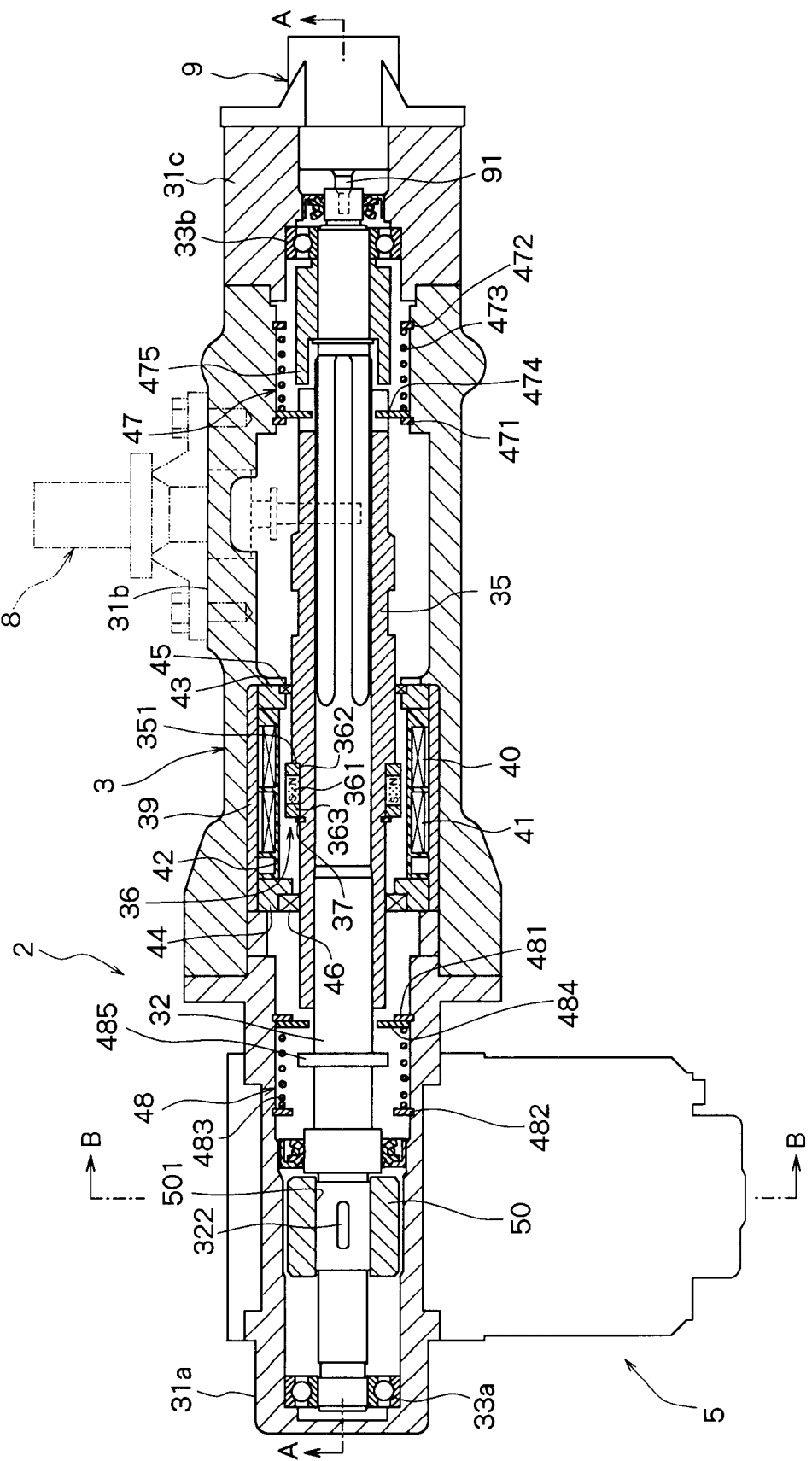
FIG. 1 is a sectional view illustrating a gear change device equipped with a shift actuator constituted according to an embodiment of the present invention.
Figure 2:
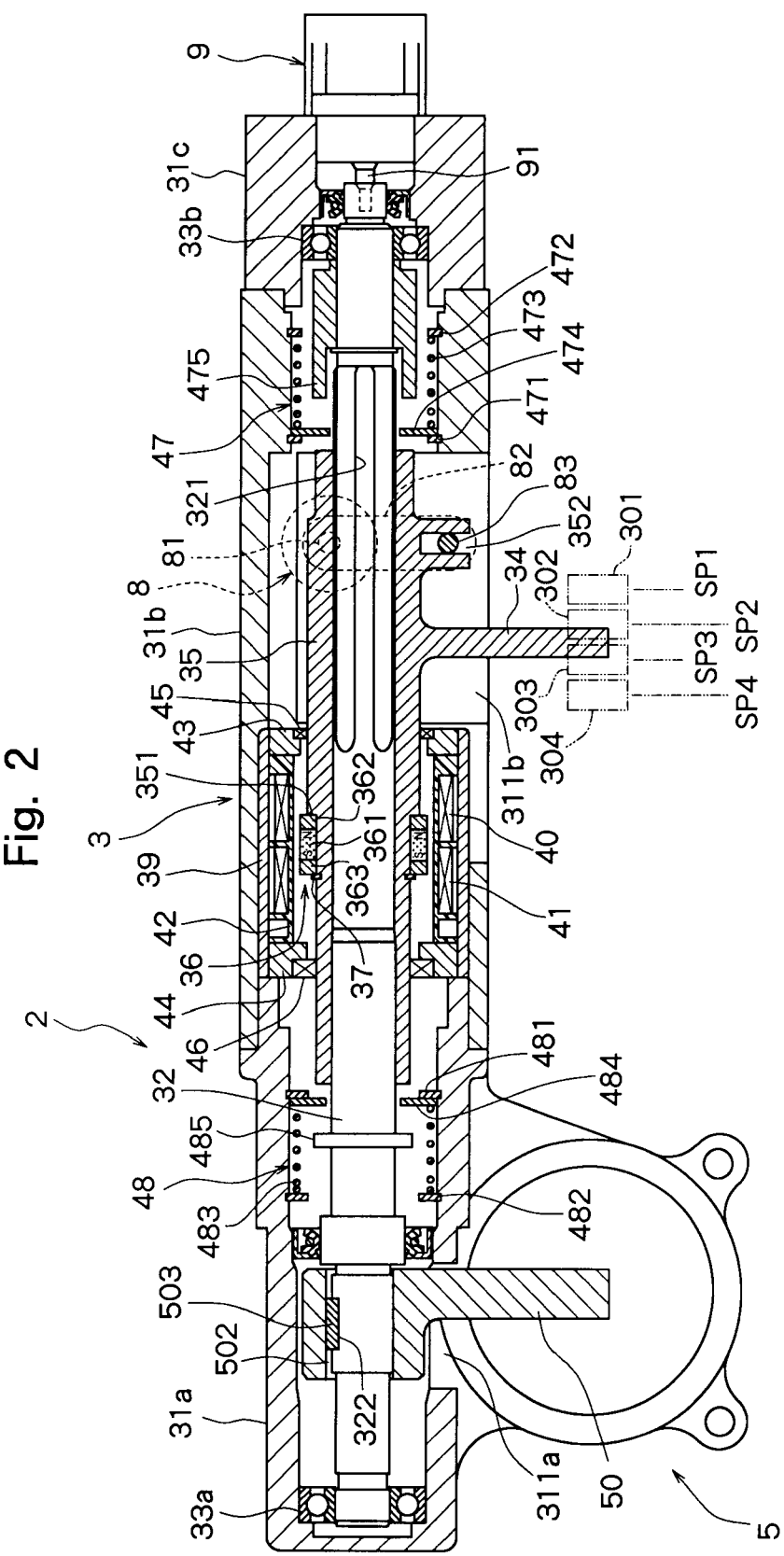
FIG. 2 is a sectional view along the line A—A in FIG. 1.

FIG. 1 is a sectional view illustrating the gear change device equipped with the shift actuator constituted according to an embodiment of the present invention, and FIG. 2 is a sectional view along the line A—A in FIG. 1.

The gear change device 2 according to the illustrated embodiment is constituted by a select actuator 3 and a shift actuator 5. The select actuator 3 has three casings 31a, 31b and 31c formed in a cylindrical shape. A control shaft 32 is arranged in the three casings 31a, 31b and 31c. Both ends of the control shaft 32 are rotatably supported by the casings 31a and 31c on both sides through bearings 33a and 33b. The control shaft 32 has a spline 321 formed in the middle portion thereof. To the spline 321 is spline-fitted a cylindrical shift sleeve 35 which is integratedly constituted with a shift lever 34 so as to slide in the axial direction. The shift lever 34 and the shift sleeve 35 are made of a nonmagnetic material such as a stainless steel or the like, the shift lever 34 being arranged passing through an opening 311b formed in the lower portion of the central casing 31b. An end of the shift lever 34 is so constituted as to come into suitable engagement with the shift blocks 301, 302, 303 and 304 that are arranged at the first select position SP1, at the second select position SP2, at the third select position SP3 and at the fourth select position SP4, and constitute a shift mechanism of a transmission that is not shown.

A magnetic moving means 36 is arranged on the outer peripheral surface of the shift sleeve 35. The magnetic moving means 36 is constituted by an annular permanent magnet 361 mounted on the outer peripheral surface of the shift sleeve 35 and having magnetic poles in both end surfaces in the axial direction and by a pair of moving yokes 362 and 363 arranged on the outer sides of the permanent magnet 361 in the axial direction. In the illustrated embodiment, the permanent magnet 361 is magnetized into the N-pole in the right end surfaces in FIGS. 1 and 2, and is magnetized into the S-pole in the left end surface in FIGS. 1 and 2. The pair of moving yokes 362 and 363 are formed in an annular shape by using a magnetic material. The thus constituted magnetic moving means 36 is positioned at its right end in FIGS. 1 and 2 of one moving yoke 362 (right side in FIGS. 1 and 2) by a stepped portion 351 formed in the shift sleeve 35 and is positioned at its left end in FIGS. 1 and 2 of the other moving yoke 363 (left side in FIGS. 1 and 2) by a snap ring 37 fitted to the shift sleeve 35, so that the motion in the axial direction is limited. A fixed yoke 39 is arranged on the outer peripheral side of the magnetic moving means 36 to surround the magnetic moving means 36. The fixed yoke 39 is formed in a cylindrical shape by using a magnetic material and is mounted on the inner peripheral surface of the central casing 31b. A pair of coils 40 and 41 are arranged inside the fixed yoke 39. The pair of coils 40 and 41 are wound on a bobbin 42 that is made of a nonmagnetic material such as a synthetic resin or the like and is mounted along the inner peripheral surface of the fixed yoke 39. The pair of coils 40 and 41 are connected to a power source circuit that is not shown. The length of the coil 40 in the axial direction is set to be a length nearly corresponding to the length of selection from the first select position SP1 up to the fourth select position SP4. End walls 43 and 44 made of a nonmagnetic material are mounted on both sides of the fixed yoke 39. Sealing members 45 and 46 which come in contact with the outer peripheral surfaces of the shift sleeve 35 are mounted on the inner peripheries of the end walls 43 and 44.

Figure 3:
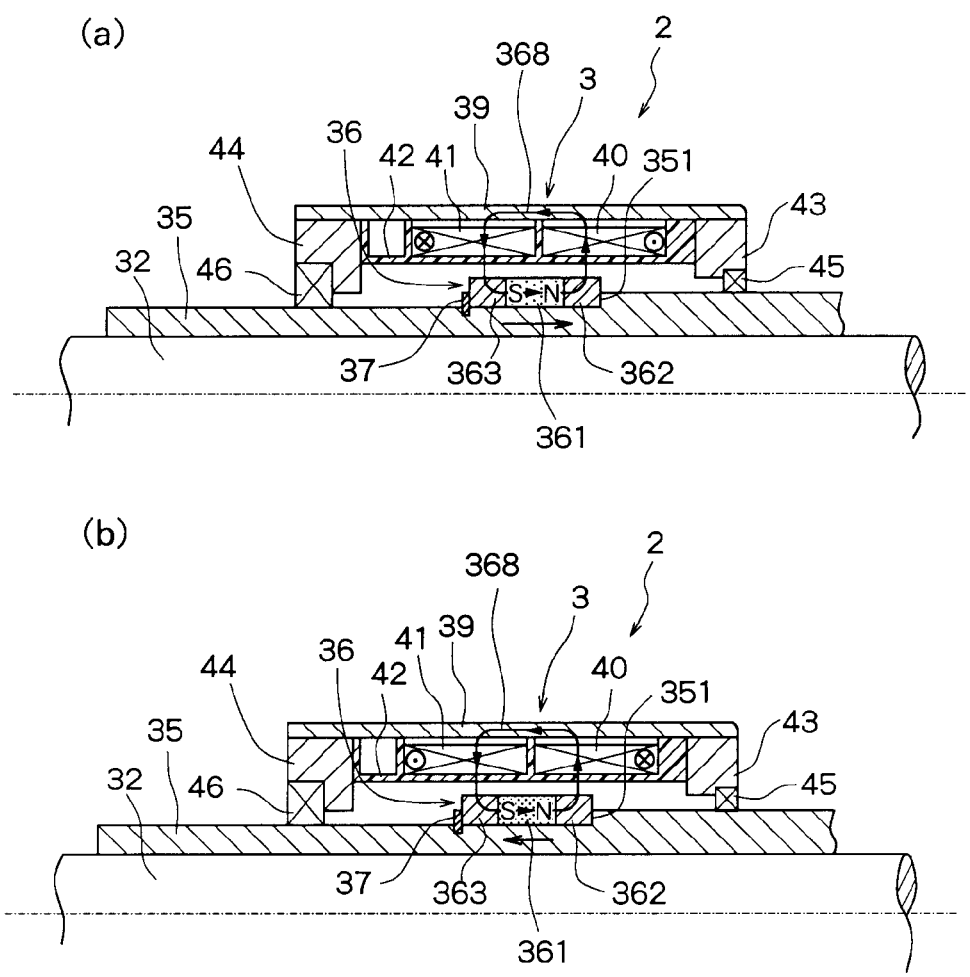
FIG. 3 is an explanatory view illustrating the operation of a select actuator that constitutes the gear change device shown in FIG. 1.

The select actuator 3 is constituted as described above and operates based on the principle of a linear motor constituted by the magnetic moving means 36 arranged on the shift sleeve 35, the fixed yoke 39 and the pair of coils 40 and 41. The operation will now be described with reference to FIG. 3.

In the select actuator 3 of the first embodiment, there is established a magnetic circuit 368 passing through the N-pole of the permanent magnet 361, one moving yoke 362, one coil 40, the fixed yoke 39, the other coil 41, the other moving yoke 363 and S-pole of the permanent magnet 361, as shown in FIGS. 3(a) and 3(b). In this state, when electric currents are fed to the respective pair of coils 40 and 41 in the opposite directions as shown in FIG. 3(a), the permanent magnet 361, i.e. the shift sleeve 35 produces a rightward thrust as indicated by an arrow in FIG. 3(a) according to the Fleming's left-hand rule. As shown in FIG. 3(b), on the other hand, when the electric currents are fed to the pair of coils 40 and 41 in the opposite directions opposite to those of FIG. 3(a), the permanent magnet 361, i.e., the shift sleeve 35 produces a leftward thrust as indicated by an arrow in FIG. 3(b) according to the Fleming's left-hand rule. The magnitude of thrust produced by the magnetic moving means 36, i.e., the shift sleeve 35 is determined by the amount of electric power fed to the pair of coils 40 and 41.

The select actuator 3 of the illustrated embodiment has the first select position-limiting means 47 and the second select position-limiting means 48 for limiting the position second select position SP2, to the third select position SP3 or to the fourth select position SP4 in cooperation with the magnitude of thrust acting on the magnetic moving means 36, i.e., on the shift sleeve 35. The first select position-limiting means 47 comprises snap rings 471 and 472 mounted on the central casing 31b at the right end portion in FIGS. 1 and 2 at a predetermined distance, a compression coil spring 473 arranged between the snap rings 471 and 472, a moving ring 474 arranged between the compression coil spring 473 and one snap ring 471, and a stopper 475 which limits the motion of the moving ring 474 by coming in contact therewith when the moving ring 474 has moved toward the right by a predetermined amount in FIGS. 1 and 2.

In the first select position-limiting means 47 constituted as described above, when a current of a voltage of, for example, 2.4 V is fed, as shown in FIG. 3(a), to the pair of coils 40 and 41 in a state shown in FIGS. 1 and 2, the magnetic moving means 36, i.e., the shift sleeve 35 moves toward the right in FIGS. 1 and 2, whereby the right end of the shift sleeve 35 comes in contact with the moving ring 474 in FIGS. 1 and 2, and is limited for its position. In this state, the resilient force of the coil spring 473 has been so set as to become larger than the thrust acting on the magnetic moving means 36, i.e., on the shift sleeve 35 and hence, the shift sleeve 35 that has come in contact with the moving ring 474 is brought to a halt at a position at which the moving ring 474 is in contact with one snap ring 471. In this case, the shift lever 34 constituted integratedly with the shift sleeve 35 is brought to the second select position SP2. Next, when a current of a voltage of, for example, 4.8 V is fed to the pair of coils 40 and 41 as shown in FIG. 3(a), the thrust acting on the yoke 36, i.e., on the shift sleeve 35 becomes larger than the resilient force of the coil spring 473. Accordingly, the shift sleeve 35 comes in contact with the moving ring 474 and, then, moves toward the right in FIGS. 1 and 2 against the resilient force of the coil spring 473, and is brought to a halt at a position at which the moving ring 474 is in contact with the stopper 475. At this moment, the shift lever 34 constituted integratedly with the shift sleeve 35 is brought to the first select position SP1.

Next, the second select position-limiting means 48 will be described.

The second select position-limiting means 48 comprises snap rings 481 and 482 mounted on the central casing 31b at the left end in FIGS. 1 and 2 at a predetermined distance, a coil spring 483 arranged between the snap rings 481 and 482, a moving ring 484 arranged between the coil spring 483 and one snap ring 481, and a stopper 485 which limits the motion of the moving ring 484 by coming in contact therewith when the moving ring 484 has moved toward the left by a predetermined amount in FIGS. 1 and 2.

In the second select position-limiting means 48 constituted as described above, when a current of a voltage of, for example, 2.4 V is fed, as shown in FIG. 3(b), to the pair of coils 40 and 41 in a state shown in FIGS. 1 and 2, the magnetic moving means 36, i.e., the shift sleeve 35 moves toward the left in FIGS. 1 and 2, whereby the left end of the shift sleeve 35 comes in contact with the moving ring 484 in FIGS. 1 and 2, and is limited for its position. In this state, the resilient force of the coil spring 483 has been so set as to become larger than the thrust acting on the permanent magnet 361, i.e., on the shift sleeve 35 and hence, the shift sleeve 35 that has come in contact with the moving ring 484 is brought to a halt at a position at which the moving ring 484 is in contact with one snap ring 481. In this case, the shift lever 34 constituted integratedly with the shift sleeve 35 is brought to the third select position SP3. Next, when a current of a and 41 as shown in FIG. 3(b), the thrust acting on the magnetic moving means 36, i.e., on the shift sleeve 35 becomes larger than the resilient force of the coil spring 483. Hence, the shift sleeve 35 comes in contact with the moving ring 484 and, then, moves toward the left in FIGS. 1 and 2 against the resilient force of the coil spring 483, and is brought to a halt at a position at which the moving ring 484 is in contact with the stopper 485. At this moment, the shift lever 34 constituted integratedly with the shift sleeve 35 is brought to the fourth select position SP4.

As described above, the illustrated embodiment is provided with the first select position-limiting means 47 and the second select position-limiting means 48. By controlling the amount of electric power fed to the pair of coils 40 and 41, therefore, the shift lever 34 can be brought to a desired select position without the need of controlling the position.

The gear change device according to the illustrated embodiment has a select position sensor 8 for detecting the position of the shift sleeve 35 integratedly constituted with the shift lever 34, i.e., for detecting the position thereof in the direction of selection. The select position sensor 8 comprises a potentiometer, and one end portion of a lever 82 is attached to a turning shaft 81 thereof. An engaging pin 83 attached to the other end portion of the lever 82 is engaged with an engaging groove 352 formed in the shift sleeve 35. Therefore, when the shift sleeve 35 moves toward the right or left in FIG. 2, the lever 82 swings on the turning shaft 81, whereby the turning shaft 81 turns and the operation position of the shift sleeve 35 is detected, i.e., the position thereof in the direction of selection is detected. The shift lever 34 can be brought to a desired select position by controlling the voltage and the direction of current fed to the coils 40 and 41 of the select actuator 3 by a controller (not shown), Further, the gear change device 2 of the illustrated embodiment has a shift stroke position sensor 9 for detecting a turning position of the control shaft 32 mounting the shift sleeve 35 which is integratedly constituted with the shift lever 34, i.e., for detecting the shift stroke position thereof. The shift stroke position sensor 9 comprises a potentiometer, and its turning shaft 91 is coupled to the control shaft 32. When the control shaft 32 turns, therefore, the turning shaft 91 turns and the turning position of the control shaft 32, i.e., the shift stroke position thereof is detected.

Next, an embodiment of the shift actuator constituted according to the present invention will be described with reference chiefly to FIG. 4 which is a sectional view along the line B—B in FIG. 1.

Figure 4:
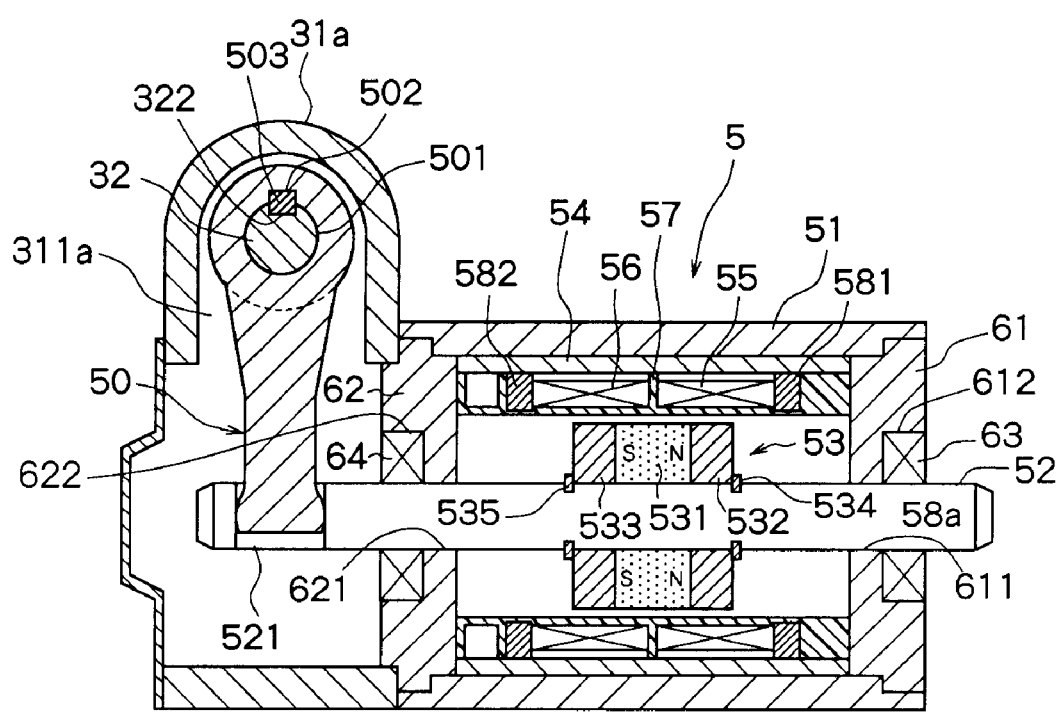
FIG. 4 is a sectional view along the line D–B in FIG. 1.

The shift actuator 5 according to the first embodiment shown in FIG. 4 has a casing 51, an operation rod 52 that is arranged in the central portion of the casing 51 and engages with the operation lever 50 mounted on the control shaft 32 arranged in the casings 31a, 31b and 31c of the select actuator 3, a magnetic moving means 53 arranged on the outer peripheral surface of the operation rod 52, a cylindrical fixed yoke 54 surrounding the magnetic moving means 53 and arranged inside the casing 51, and a pair of coils 55 and 56 arranged side by side in the axial direction inside the fixed yoke 54. The operation lever 50 that engages with the operation rod 52 has a hole 501 in the base portion thereof to be fitted to the control shaft 32, and turns integratedly with the control shaft 32 by fitting a key 503 into a keyway 502 formed in the inner peripheral surface of the hole 501 and into a keyway 322 formed in the outer peripheral surface of the control shaft 32. The operation lever 50 works as an operation member coupled to the shift lever 34 via the control shaft 32 and the shift sleeve 35, and is arranged passing through an opening 311a formed in The casing 51 in the illustrated embodiment is formed in a cylindrical shape by using a nonmagnetic material such as a stainless steel, an aluminum alloy or the like. The operation rod 52 is constituted by using a nonmagnetic material such as a stainless steel or the like, and has a notch 521 formed in the left end thereof in FIG. 5. An end of the operation lever 50 is brought into engagement with the notch 521.

The magnetic moving means 53 is constituted by an annular permanent magnet 531 mounted on the outer peripheral surface of the operation rod 52 and having magnetic poles in both end surfaces thereof in the axial direction and by a pair of moving yokes 532 and 533 arranged on the outer sides of the permanent magnet 531 in the axial direction. The permanent magnet 531 in the illustrated embodiment is magnetized into the N-pole in the right end surface in FIG. 4 and is magnetized into the S-pole in the left end surface in FIG. 4. The pair of moving yokes 532 and 533 are formed in an annular shape by using a magnetic material. The thus constituted magnetic moving means 53 is positioned by snap rings 534 and 535 mounted on the operation rod 52 on both sides of the magnetic moving means 53, and is limited from moving in the axial direction.

The fixed yoke 54 is formed in a cylindrical shape by using a magnetic material and is mounted on the inner peripheral surface of the casing 51. A pair of coils 55 and 56 are arranged inside the fixed yoke 54. The pair of coils 55 and 56 are wound on a bobbin 57 that is made of a nonmagnetic material such as a synthetic resin or the like and is mounted on the inner periphery of the fixed yoke 54. The pair of coils 55 and 56 are connected to a power source circuit that is not shown. In the illustrated embodiment, magnetic members 581 and 582 are arranged in the bobbin 57 on both sides of the pair of coils 55 and 56. The magnetic members 581 and 582 are formed in an annular shape by using a magnetic material such as iron axial direction is suitably set depending on the operation stroke of the shift actuator 5.

End walls 61 and 62 are each mounted on both sides of the casing 51. The end walls 61 and 62 are made of a nonmagnetic material such as a stainless steel, an aluminum alloy or a suitable synthetic resin, and have holes 611 and 621 formed in the central portions thereof, so that operation rod 52 is inserted therein. The operation rod 52 arranged in the holes 611 and 621 is supported by the inner peripheral surfaces of the holes 611 and 621 so as to slide in the axial direction. Notches 612 and 622 are formed in the end walls 61 and 62 in the inner peripheral portions on the outer sides thereof. Sealing members 63 and 64 are fitted into the notches 612 and 622.

The shift actuator 5 according to the illustrated embodiment is constituted as described above, and its operation will now be described with reference to FIG. 5.

The shift actuator 5 is constituted as described above, and operates based on the principle of a linear motor constituted by the magnetic moving means 53 arranged on the operation rod 52, the fixed yoke 54 and the pair of coils 55 and 56. The operation will now be described with reference to FIG. 5.

In the shift actuator 5 as shown in FIGS. 5(a) to 5(d), there is established a magnetic circuit 530 passing through the N-pole of the permanent magnet 531, one moving yoke 532, one coil 55, the fixed yoke 54, the other coil 56, the other moving yoke 533, and S-pole of the permanent magnet 531.

Figure 5:
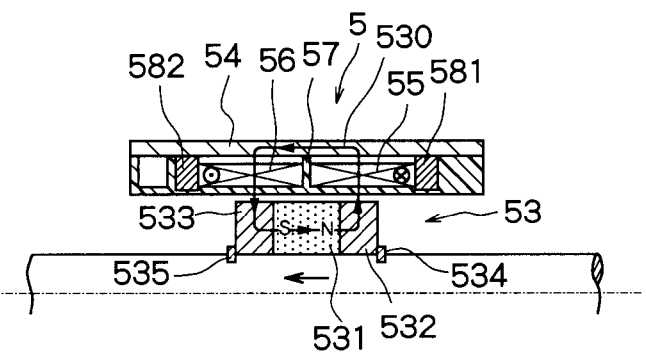
FIG. 5 is an explanatory view illustrating the operation of the shift actuator shown in FIG. 4.
Figure 5:
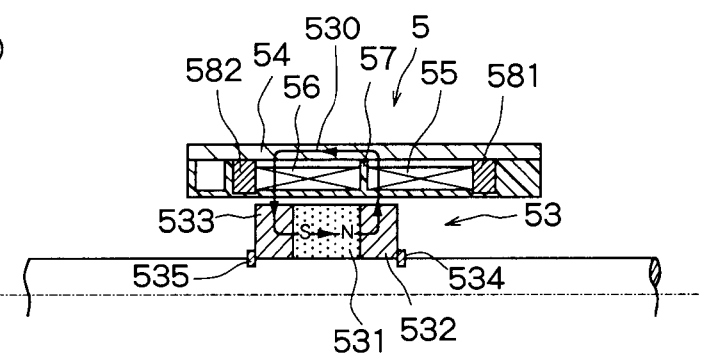
Figure 5:
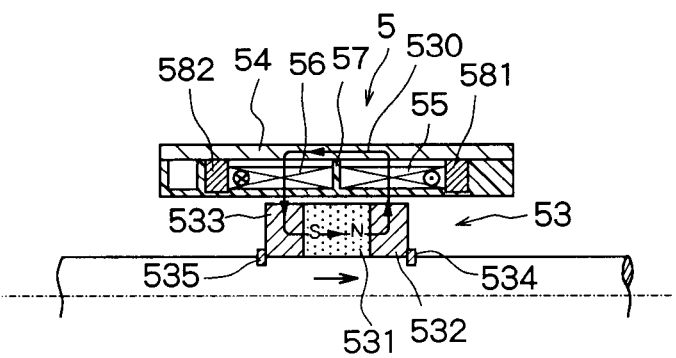
Figure 5:
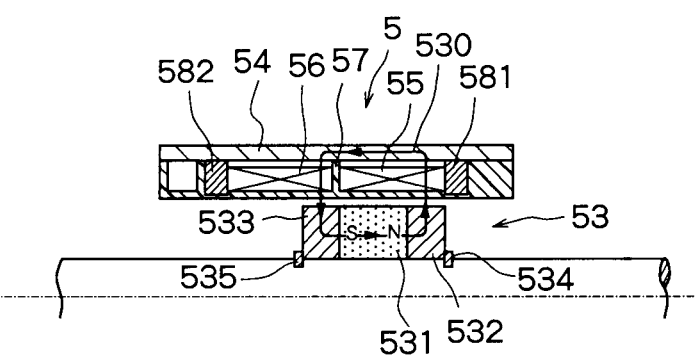

When the electric currents are fed to the pair of coils 55 and 56 in the opposite directions as shown in FIG. 5(a) in a state where the operation position of the operation rod 52 is at the neutral position shown in FIG. 5(a), the magnetic moving means 53, i.e., the operation rod 52 produces a leftward thrust as indicated by an arrow in rig. 5(a) according to the Fleming's left-hand rule. Consequently, the operation rod 52 moves toward the left in FIG. 4, and the control shaft 32 turns clockwise in FIG. 5 via the operation lever 50 which is engaged at its end with the operation rod 52. Accordingly, the shift lever 34 constituted integratedly with the shift sleeve 35 mounted on the control shaft 32 is shifted in one direction. Then, as the magnetic moving means 53, i.e., the operation rod 52 arrives at a position shown in FIG. 5(b), the controller (not shown) so judges that it has operated up to one shift stroke end, i.e., up to the gear-engaging position based on a signal from the shift stroke position sensor 9, and interrupts the flow of current to the pair of coils 55 and 56.

Next, when the electric currents are fed to the pair of coils 55 and 56 in the opposite directions (directions opposite to those of FIG. 5(a)) as shown in FIG. 5(c) in a state where the operation position of the shift plunger 52 is at the neutral position, the magnetic moving means 53, i.e., the operation rod 52 produces a rightward thrust as indicated by an arrow in FIG. 5(c) according to the Fleming's left-hand rule. As a result, the operation rod 52 moves toward the right in FIG. 4, and the control shaft 32 turns counterclockwise in FIG. 4 via the operation lever 50 of which the end portion is engaged with the operation rod 52. Accordingly, the shift lever 34 constituted integratedly with the shift sleeve 35 which is mounted on the control shaft 32 is shifted in the other direction. Then, as the magnetic moving means 53, i.e., the operation rod 52 arrives at a position shown in FIG. 5(d), the controller (not shown) so judges that it has operated up to the other shift stroke end, i.e., up to the gear-engaging position based on a signal from the shift stroke position sensor 9, and interrupts the flow of current to the pair of coils 55 and 56.

Figure 6:
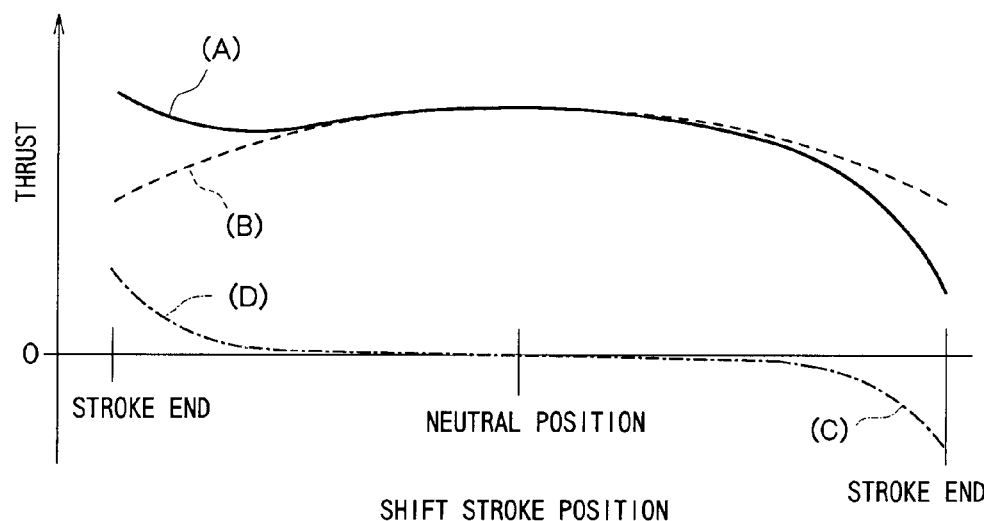
FIG. 6 is explanatory diagrams illustrating the driving force of the shift actuator shown in FIG. 4.
Figure 6:
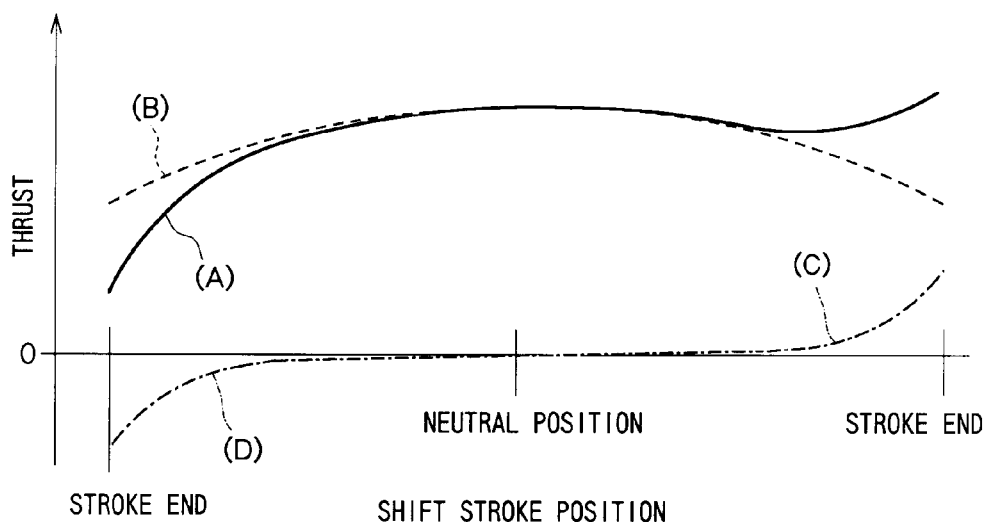

Here, the driving force of the shift actuator 5 will be described with reference to FIG. 6.

FIG. 6(a) illustrates the driving force of the shift actuator 5 of when the magnetic moving means 53, i.e., the operation rod 52 is operated toward the left, and FIG. 6(b) illustrates the driving force of the shift actuator 5 when the magnetic moving means 53, i.e., the operation rod 52, is operated toward the right. In FIGS. 6(a) and 6(b), broken lines (B) represent thrust characteristics based on the principle of a linear motor constituted by the magnetic moving means 53, the fixed yoke 54 and the pair of coils 55 and 56, chain lines (C) represent attractive forces between the permanent magnet 531 and the magnetic member 581, chain lines (D) represent attractive forces between the permanent magnet 531 and the magnetic member 582, and solid lines (A) represent driving forces of the select actuator 5 when an electric current is fed to the pair of coils 55 and 56. That is, the driving force of the shift actuator 5 of when an electric current is fed to the pair of coils 55 and 56 represented by the solid line (A) is a synthesis of the thrust represented by the broken line (B) produced based on the principle of the linear motor constituted by the magnetic moving means 53, the fixed yoke 54 and the pair of coils 55 and 56, and attractive forces represented by the chain lines (C) and (D) between the permanent magnet 531 and the magnetic members 581, 582. In the shift actuator 5 of the illustrated embodiment, the pair of magnetic members 581 and 582 are arranged on both sides of the pair of coils 55 and 56. Even when no current is supplied to the pair of coils 55 and 56, therefore, the attractive forces act between the permanent magnet 531 and the magnetic members 581, 582 as represented by chain lines (C) and (D). The attractive forces increase as the permanent magnet 531 and the moving yokes 532, 533 approach the magnetic members 581 or 582, and become the largest at the shift stroke ends. In moving the magnetic moving means 53, i.e., the operation rod 52 toward the left in FIG. 6(a), the attractive force between the permanent magnet 531 and the magnetic member 581, represented by the chain line (C), works to prevent the motion toward the neutral position at the gear-engaging position shown in FIG. 5(d), i.e., works as a force to prevent the gear of the transmission from undesirably disengaging, i.e., works as a self-holding function. In moving the magnetic moving means 53, i.e., the operation rod 52, toward the right in FIG. 6(b), on the other hand, the attractive force between the permanent magnet 531 and the magnetic member 582 represented by the chain line (D) works to prevent the motion toward the neutral position at the gear-engaging position shown in FIG. 5(b), i.e., works as a force to prevent the gear of the transmission from undesirably disengaging, i.e., works as a self-holding function. In general, the shifting mechanism of the transmission is equipped with a detent mechanism for holding a state in which the shift lever has been shifted to the shift stroke end, i.e., the gear-engaged state, in order to prevent the gear from undesirably disengaging. In the illustrated embodiment, the attractive force between the permanent magnet 531 and the magnetic member 581 or 582 works as the detent mechanism near the shift stroke end.

In the foregoing is described the embodiment in which the invention has been applied to the shift actuator constituting the gear change device together with the select actuator. The invention, however, can further be applied to, for example, a shift-assisting device which assists the operation force in the direction of shift in the manual transmission.

Being constituted as described above, the shift actuator for the transmission according to the present invention exhibits actions and effects as described below.

That is, according to the present invention, the shift actuator for the transmission comprises an operation rod that engages with an operation member coupled to the shift lever of the transmission, a magnetic moving means arranged on the outer peripheral surface of the operation rod, a cylindrical fixed yoke surrounding the magnetic moving means, and a pair of coils arranged side by side in the axial direction inside the fixed yoke, wherein magnetic members are arranged on both sides of the pair of coils. Even when no current is fed to the pair of coils, therefore, the attractive force acts between the magnetic moving means and the pair of magnetic members. The attractive force becomes the largest at the shift stroke end, i.e., at the gear-engaging position, and works as a detent function for preventing the gear from undesirably disengaging.

What we claim is:

1. A shift actuator for a transmission, said shift actuator comprising:
   an operation rod adapted to engage an operation member coupled to a shift lever of the transmission,
   magnetic moving means arranged on the outer peripheral surface of said operation rod,
   cylindrical fixed yoke surrounding said magnetic moving means,
   pair of coils arranged side by side in the axial direction inside said fixed yoke, and magnetic members arranged on both sides of said pair of coils.

2. A shift actuator according to claim 1, further comprising a bobbin having said magnetic members arranged therein and said pair of coils wound thereon.

3. A shift actuator for a transmission, said shift actuator comprising:
   a casing;
   an operation rod mounted for longitudinal movement within said casing, said operation rod being adapted to engage an operation member coupled to a shift lever of the transmission;
   a permanent magnet mounted on said operation rod for movement therewith;
   a yoke fixed to an interior surface of said casing and surrounding said permanent magnet;
   a pair of coils mounted side by side in said yoke and adapted to be connected to a pair of voltage sources; and p1 a pair of magnetic members mounted on said operation rod, each magnetic member being adjacent a respective one of said coils and positioned to cooperate with said permanent magnet so as to function as a detent mechanism for said shift actuator.

* * * * *